Patent

2,727,023

ETHYLENE POLYMERIZATION

Bernard L. Evering, Chicago, Ill., Alan K. Roebuck, Dyer, Ind., and Alex Zletz, Park Forest, Ill., assignors to Standard Oil Company, Chicago, Ill., a corporation of Indiana No Drawing. Application December 1, 1951,
Serial No. 259,508

4 Claims. (Cl. 260—94.9)

This invention relates to the polymerization of ethylene and has reference more particularly to a process of converting ethylene in substantial yields to normally solid, wax-like or tough, resinous polymerization products. In a more specific aspect, the invention is directed to the preparation, over a solid catalyst, of tough, resinous, chemically inert, high molecular weight polymers having the essential characteristics of the commercial polyethylene films that have molecular weights in the range of about 10,000 to about 30,000.

The conversion of ethylene to dimers and to normally liquid olefins boiling within the gasoline boiling range, principally hexenes, in the presence of active carbon-supported cobalt and nickel catalysts, is known. It is also known to polymerize ethylene to form normally solid, relatively high molecular weight products by subjecting the ethylene to high temperatures and extremely high pressures (at least 100° C. and at least 15,000 p. s. i. g.) optionally in the presence of small proportions of oxygen (as in the processes described in U. S. Patent 2,153,553 of E. W. Fawcett et al. and 2,188,465 of M. W. Perrin et al.) or of peroxide catalysts, usually at high temperatures and pressures. Copending applications which have now matured as U. S. Patents 2,658,059 and 2,692,261 relate respectively to the polymerization of ethylene in vapor phase over nickel or cobalt on charcoal to provide a solid polymer and to the polymerization of ethylene in a solvent by contacting the ethylene solution with nickel or cobalt supported on activated carbon. These applications disclose processes whereby normally solid polymers having as high molecular weight as about 25,000 or even more can be obtained in predominant yields.

The present invention is concerned with the polymerization of ethylene in liquid phase operation using activated carbon supported nickel or cobalt. Certain inherent difficulties arise in liquid phase polymerization of ethylene over a nickel- or cobalt-on-carbon catalyst, particularly with reference to particle size of the catalyst. We have found that when the catalyst is used, not as a powder, but as particles of a size that will remain on a 14 mesh sieve, undesirably low molecular weight product is obtained; to ensure the uniform production of polymer having a molecular weight of 12,000 or higher, the catalyst must be used as powder. When, for example, cylinders of about 1/16 to 3/4 inch length and 1/16 to 3/4 diameter, or when granules such as 6 to 14 mesh are employed, molecular weights of the order of about 8,000 are usually obtained. In general, it is desirable to obtain polymers of higher than about 15,000 molecular weight since the physical properties of the polymer relative to flexibility, toughness and extensibility are usually not satisfactory for polymers of less than about 15,000 molecular weight. It would therefore appear to be clearly advisable to use a powdered catalyst. However, ethylene polymerization in the presence of powdered catalyst particles encounters a severe problem in the separation of high molecular weight polymer from the catalyst. Not only is catalyst recovery from the product rendered difficult, but also the production of entirely catalyst-free, clear polymer is substantially infeasible.

A primary object of this invention, therefore, is the provision of catalyst composition and an improved process employing the same which will produce a polyethylene, of desired molecular weight and concomitant favorable characteristics, that is readily separable from the catalyst composition.

Another object of the invention is the provision of an ethylene-polymerization catalyst that is of strong, rugged structure, that is self-supporting in tall columns and resists disintegration during prolonged reaction periods.

The invention has for further objects such other advantages or results as will be found in the specification and claims hereinafter made.

We have found that, when the ethylene polymerization catalyst, which consists of the reduced oxides of nickel or of cobalt (presumably substantially entirely elemental nickel or cobalt) deposited on activated carbon, is formed as a well comminuted powder, is then intermixed with an inert porous filler of the type comprising silica, alumina, zirconia, kieselguhr, or the like and when the mixture is pelleted, generally to a size employed in fixed bed reactors, the powdered metal-on-carbon catalyst, being so-distributed at spaced intervals throughout the porous catalyst support, surprisingly produces high molecular weight product in substantially the yields obtained by powdered catalyst; and the very considerable difficulty of removing polymeric product from the powdered catalyst is eliminated.

In addition to mixing and pelleting the dry powdered catalyst and filler, an intimate mixture of the metal-carbon catalyst with the filler material such as alumina, zirconia or silica can also be obtained by suspending the powdered catalyst in a sol or gel of the inert filler, and drying the suspension to formed gelled granules.

Nickel or cobalt alone is not an effective ethylene polymerization catalyst; neither is activated carbon alone. It is only the admixture of these two elements that constitute the catalyst. For purposes of clarity, therefore, the said admixture will be termed, herein, the "catalyst" or the "metal-carbon catalyst" or the "nickel-carbon" or "cobalt-carbon" catalyst or, with reference to the manner in which the catalyst is usually prepared it may be termed "metal-impregnated carbon catalyst." When the catalyst is dispersed throughout a porous catalyst support to form the improved catalyst composition of this invention, it will be termed "supported catalyst" or "supported metal-carbon catalyst."

The supported catalyst composition can be pilled or pelleted in the form, for example, of cylinders, or it can be in the form of granules in which the catalyst powder is distributed throughout the inert porous supporting material. There is no critical upper limit with respect to the particle size of the supported catalyst composition, and the size of the larger particles, which can be, for example, about 1 inch, will usually be determined by conventional requirements. As a minimum, the supported metal-carbon catalyst particles should be large enough to be retained on a 20 mesh sieve or be about 0.035" in either dimension, preferably the largest dimension, and more preferably should be about 0.1 inch in the largest dimension.

The relatively large proportion of inert porous supporting material in the catalyst composition provides a rugged catalyst particle that will support a considerable weight of catalyst and will resist disintegration.

The supported catalyst composition can contain from 2 to 50% by weight, and preferably from 5 to 25% by weight of the metal-carbon catalyst without a marked decrease in molecular weight of product being observed. When the supported catalyst composition is composed of a nickel-carbon catalyst admixed with powdered alumina, preferably no more than about 10% by weight of the metal-carbon catalyst based on the total weight of supported catalyst composition should be employed in order to ensure a high strength and physical stability of the supported catalyst.

The term "powdered" as used herein and as employed in the claims means an approximate particle size such that substantially all of the particles will pass through a 100 mesh screen and preferably such that all will pass through a 200 mesh screen and may have a dimension as low as one micron. As measured by the U. S. Bureau of Standard or Tyler Standard Sieves this range represents particle sizes having a largest dimension less than 0.0059 inch and preferably less than 0.0029 inch. The powdered catalyst of this defined size will be intermixed with inert supporting particles and the supported catalyst will have, as aforementioned, sizes ranging preferably from about 1 inch to 0.1 inch in their largest dimension.

The improved polymerization process of the present invention comprises bringing ethylene, substantially free of catalyst poisons or ethylene polymerization inhibitors, into contact with an activated carbon-supported metal preferably selected from the class consisting of nickel, cobalt, and nickel-cobalt mixtures, the catalyst being powdered, as hereinafter defined, and being intimately distributed at spaced intervals throughout the inner and outer surfaces of a porous inert supporting material such as alumina, zirconia, kieselguhr, or the like. Operating conditions include a temperature that is sufficient to induce ethylene polymerization, the said temperature being between about 10° and about 300° C., and a polymerization pressure between about 15 and 15,000 pounds per square inch gauge. The ethylene is polymerized either in the presence of a liquid reaction medium such as benzene, xylene, n-octane, naphthenes, chloro-benzene or the like as described in U. S. 2,692,261, or as a vapor as described in U. S. 2,658,059, and a weight space velocity in the range of about 0.01 to about 5 grams of ethylene per hour per gram of catalyst. The nickel catalyst is much to be preferred because under equivalent operating conditions it produces larger amounts of normally solid ethylene polymers.

In an example of preparation of the catalyst of the present invention, a nickel-on-charcoal catalyst is prepared by the addition of nickel nitrate to activated carbon or charcoal. The supported nickel nitrate is then decomposed with steam or by reduced pressure between about .1 and 50 mm. of mercury and at a temperature between about 150° to 425° C., or preferably 260° C. The catalyst is then ground to a fine powder in a ball mill. The catalyst can contain from about 0.5 to 25% by weight of nickel based on the total nickel-carbon catalyst weight. This powder is intermingled with an inert material as described hereinabove. The inert material can be a silica gel, alumina or zirconia or any suitable inert and pelletable material. The catalyst and inert filler can be mixed in the proportions by weight, respectively, of about 1:1 to about 1:50 and preferably of about 1:20 to about 1:3. The mixture is then pressed into pills of a size commonly employed in a fixed bed reactor and can vary in size from 1 inch down to granules or pellets that will remain on a 20 mesh sieve. The so-produced catalyst can be reduced to substantially elemental nickel before being used or it can be mixed with the inert filler after reduction and then be pelleted in an inert atmosphere.

The careful control of conditions that are employed in the preparation of the catalyst effect striking differences in yields obtainable subsequently in the ethylene polymerization process. If, for example, the nickel nitrate is decomposed in an atmosphere of steam rather than under a vacuum and if optimum temperatures of reduction of the nickel oxide are maintained between 200° to 235° C. and if the charcoal is originally treated by nitric acid leaching step, the yield of polyethylene obtainable in the process can be increased by as much as 200%.

With the exception of the catalyst employed, operation of the polymerization process is substantially as described in the aforementioned copending applications which have now issued as U. S. Patents 2,692,261 and 2,658,059. As presented with particularity therein, feed stock, containing ethylene and, permissibly, diluent paraffins and from which catalyst poisons such as carbon monoxide and ammonia have been removed, can be fed as a vapor, or in solution, or in a liquid reaction medium, into a variety of reactors. Thus, the process is adaptable to fixed bed or to moving bed type operation or slurry type operation may be employed. Preferred operating temperatures lie within the range of 100° to 150° C., at which temperatures the normally solid ethylene polymers are in molten or semi-liquid condition, which facilitates the removal of polymer from the catalyst and appears to facilitate ethylene transfer through the polymer to the catalyst surface. Relatively low pressures can be employed, for example, pressures between about 300 and 8,000 pounds per square inch gauge. High molecular weight polymer is recovered from an effluent stream or removed from the reactor.

High molecular weight polyethylene can be removed from the supported catalyst particles by treating the particles with a dewaxing or deresining solvent. This solvent is preferably an aromatic hydrocarbon such as benzene, toluene, a xylene, p-cymene, sec-butyl benzene, naphthenes and the like, although we may employ other solvents such as halogenated aromatics, ethyl benzoate, anisole, etc. Temperatures of about the melting points of the polymer, usually temperatures within the range of about 100° C. to about 150° C., may be employed. Pressures suitable to maintain the above mentioned solvents in liquid form are used. After such extraction treatment the polyethylene can readily be recovered from the solvents by cooling and filtering.

The tough resinous high molecular weight polymers which are produced by the above-described process are characterized by solubility in boiling xylene and crystalline melting points between about 100° and 150° C., and specific viscosities ($n_{sp} \times 10^5$) between about 10,000 and about 25,000. The specific viscosities hereinafter reported were determined by the Staudinger method (Z. Phys. Chem. 171, 129 (1934)), using 0.125 gram of polyethylene per 100 ml. of boiling xylene at 85° C. for the viscosity measurements. These specific viscosities are substantially directly proportional to the molecular weight, the molecular weight being roughly equivalent to a factor of between 1.5 and 2 $\times$ the specific viscosity $\times$ $10^5$. The tough resinous polymers can be cast, molded, and extruded, and may be processed by the methods heretofore employed for other well known polyethylene resins, and may be applied to the same or similar uses.

In the following specific examples the employed catalyst was usually prepared by soaking activated carbon in an aqueous solution of nickelous nitrate hexahydrate. The employed activated charcoal was a coconut charcoal characterized by a surface area of about 1200 square meters per gram, a pore volume of about 0.59 cc. per gram, and a pore diameter of about 21 A. The activated charcoal contains trace components such as sodium and potassium, and to remove these and other components it was leached with a dilute nitric acid at about room temperature for a period of about one half hour. The leaching effected some evolution of gases, which eventually ceased. The filtered and dried charcoal showed a reduction in weight between about 3 and 8% as a result of the leaching. An aqueous solution of the nickelous nitrate was then brought into contact with the carbon in sufficient amount to cause a desired amount of nitrate to be absorbed upon the carbon. The absorbed nickelous nitrate was then thermally decomposed, preferably in the presence of steam, to yield a corresponding metal oxide. Decomposition also has been performed under a reduced pressure, between about 1 and 20 mm. of mercury. The metal oxide on the active carbon was then reduced by treatment with hydrogen at temperatures between about 200° and about 300° C. and pressures between about atmospheric pressure and about 1500 p. s. i. g.

The following specific examples illustrate ethylene polymerizations both in the presence of nickel-on-carbon pellets and powder and in the presence of the supported nickel-on-carbon catalyst of our invention in order to demonstrate the peculiar efficacy of the latter.

*Example 1*

In this example a nickel-on-charcoal catalyst consisting of 6 to 14 mesh granules, free of inert filler, was employed in the polymerization of ethylene, and, as hereinafter shown, effected the production of a polyethylene of undesirably low average molecular weight.

Coconut charcoal (6–14 mesh) which had been leached with nitric acid was impregnated with a solution of nickelous nitrate. The charcoal support, so impregnated with nickelous nitrate, was separated from the solution and was thereafter decomposed under reduced pressure resulting in the formation of nickel oxide on charcoal. The nickel oxide was activated with hydrogen at a temperature of about 260° C. The catalyst prepared as above contained about 5% of nickel based on the total weight of catalyst. The 6–14 mesh (96 grams) catalyst particles were placed in a batch reactor. About 100 ml. of benzene were added to the reactor to act as a liquid reaction medium. Ethylene was pumped into the reactor until a pressure of about 1100 pounds per square inch gauge was attained. The reactor was maintained at a temperature of about 120° C. for a period of three and one half hours. A total of 10.9 grams of solid product was obtained. A part of this product, i. e., 5.4 grams, exhibited a specific viscosity ($n_{sp}$) of $5600 \times 10^{-5}$, thus indicating the product to be relatively low in molecular weight. This fraction was fairly brittle and hard. The remaining part of the product was greaselike and of still lower specific viscosity.

*Example 2*

In this example, a powdered nickel-on-carbon catalyst was employed.

A commercial grade of activated coconut charcoal (6–14 mesh) was leached with nitric acid, separated from the acid, and dried. The charcoal was then soaked in an aqueous solution of nickelous nitrate hexahydrate. The charcoal was dried, leaving the nitrate on the charcoal. This was decomposed under vacuum at 260° C. and the resulting nickel oxide-charcoal catalyst was powdered in a ball mill. The nickel oxide-charcoal catalyst (25 grams) was introduced into a batch reactor of 183 ml. capacity and treated with hydrogen. Xylene (100 ml.) was added to the bomb. Ethylene was introduced to the reactor until a pressure of 1100 pounds per square inch was reached. The reaction time was about two hours during which the ethylene pressure was kept above 1000 pounds per square inch. A solid product was obtained and consisted of 13.5 grams of resinous polyethylene and 2.0 grams of a waxy polyethylene. The specific viscosity of the resinous polyethylene ($n_{sp} \times 10^5$) was 21,800. Complete separation of the catalyst powder from the polymer could not be obtained; even after adding several volumes of hot xylene and filtering several times, the product retained a light grey coloration.

*Example 3*

A catalyst consisting essentially of 5% nickel mounted on the same grade of commercial activated carbon (6–14 mesh) as used in Example 2 was prepared by impregnation as discussed in Example 2. Steam was passed over these granules of nickel nitrate on carbon at 260° C. to decompose the nickel nitrate to nickel oxide. This nickel oxide carbon catalyst was then powdered in a ball mill. This powder (7.5 grams) was charged to a 183 ml. bomb and activated with hydrogen.

The bomb was evacuated and 100 ml. of xylene were charged. Ethylene was charged to 1050 pounds per square inch gauge and the polymerization was conducted for two hours. The bomb was cooled and the mixture of catalyst and polymer was removed from the bomb and dried and found to weigh 21.4 grams of which 13.9 grams were polymer. This mixture was treated with boiling xylene and filtered several times. We obtained 4.7 grams of tough and flexible polymer and 1.5 grams of wax-like polymer. The tough and flexible polymer had a specific viscosity of $15,600 \times 10^{-5}$. Thus steam decomposition of the nickel nitrate gave a satisfactory nickel charcoal catalyst, but the polymer is very difficult to separate from the finely divided powder as shown by the poor recovery of polymer.

*Example 4*

In this example granules of leached and activated charcoal were impregnated with nickelous nitrate, dried, and decomposed under reduced pressure to prepare nickel oxide-on-charcoal. This nickel oxide-on-charcoal (26 g.) was charged to a 183 ml. bomb and activated with hydrogen. Xylene (100 ml.) was added to slurry the catalyst at this temperature. Ethylene was charged at a pressure of about 1000 pounds per square inch gauge. A temperature of 120° C. was maintained for a reaction period of approximately two hours. This solid product had a specific viscosity ($n_{sp} \times 10^5$) of 13,400 and was tough and flexible. Less than five grams of separable solid product was obtained. Even though xylene was present and even though it is an effective solvent for removing polyethylene from a catalyst, it was not substantially effective in removing catalyst from this finely divided powder. Removal of the polyethylene from the powdered catalyst was very difficult, and even though a solvent was used during the reaction this solvent did not prevent substantial deposition of resin upon the catalyst or make any easier the removal of resin from the catalyst powder.

*Example 5*

In this example a powdered nickel charcoal catalyst prepared in the same manner as that of Example 2 except that decomposition of the nickel nitrate was effected in the presence of steam instead of under vacuum, was pelleted with a support.

An activated coconut charcoal was leached with nitric acid, subsequently soaked in an aqueous solution of nickelous nitrate hexahydrate, separated therefrom, and the salt absorbed thereon was decomposed with steam to the oxide. The nickel oxide-on-charcoal product contained 5% of nickel by weight of the total catalyst. It was mixed with 90% by weight of powdered alumina and was thereafter pelleted in 3/16 inch pills. These pills (25 grams) were introduced into the bomb and treated with hydrogen at 260° C. The bomb was evacuated and xylene (100 ml.) was charged. Ethylene was introduced into the reactor to a pressure of 1100 pounds per square inch gauge. The reactor was maintained at a temperature of about 130° C. for about two hours. A good yield of polymer per gram that is 2.3 grams of polymer were obtained by contact with 2.5 grams of active nickel-charcoal catalyst component. The product was notable, particularly for its high specific viscosity, which was about $16,000 \times 10^{-5}$.

The foregoing run was repeated using substantially identical conditions and another portion of the same catalyst employed above. Here a slightly higher yield of solid polymer, 3.0 grams of polymer per 2.5 grams of active nickel-charcoal active catalyst component, was obtained and a slightly higher specific viscosity, $16,800 \times 10^{-5}$, was obtained. The polymer was readily separated from the catalyst with xylene.

*Example 6*

In this example a nickel-charcoal catalyst was employed, intimately mixed with a zirconia support, the resulting catalyst being in granular form.

A nickel-charcoal catalyst was prepared in a manner similar to the methods hereinbefore reported, charcoal granules which were previously leached with nitric acid being immersed in a solution of nickelous nitrate of such concentration that about 5% of nickel based on the weight of the total nickel charcoal catalyst was absorbed. The granules of carbon containing absorbed nickel nitrate were dried and then heated in the presence of steam to 260° C. to decompose the nickel nitrate. The nickel oxide-charcoal granules were ground in a ball mill to a fine powder and were then added as a slurry to a zirconia gel prepared as follows. Ninety-five grams of anhydrous zirconium chloride were dissolved in water and precipitated as a zirconia gel by adding ammonium hydroxide to the solution until a pH of 8 was reached. A precipitated gel was washed four times with three liters each of water. Ten grams of the nickel oxide-on-charcoal catalyst powder were then slurried with the gel in water and the mixture of gel and catalyst was then dried at a temperature of 150° C. The dried precipitate was in granular form, and from these granules were selected those passing through a 6 mesh and remaining on a 20 mesh standard sieve.

Twenty-five grams of these granules were placed in a rocking bomb having a capacity of 183 ml. The granules were heated to a temperature of 218° C. and were treated with hydrogen in the same manner as in experiments of the above examples. Thereafter purified xylene was introduced into the reactor and ethylene was fed into the reactor at a pressure of 1,000 pounds per square inch gauge. The temperature was maintained at about 120° C. for about two hours and the pressure was maintained at 1,000 pounds. A yield of about 8.9 grams of solid polymer and about 3.4 grams of wax was obtained. Twenty-five grams of catalyst including support were used and ten grams of the catalyst were contained in each sixty grams of catalyst plus support; the yield per gram of catalyst was $8.9 \times 6/25$, or 2.1 grams of polymer per gram of active nickel-charcoal catalyst. A tough flexible polymer was obtained having a specific viscosity of $16,100 \times 10^{-5}$. The polymer was readily separated from the catalyst with xylene.

*Example 7*

A powdered nickel oxide-charcoal catalyst was prepared in a manner identical to that described in Example 6. About thirty-three grams of the powdered nickel-oxide-carbon catalyst powder was slurried with a precipitated zirconia gel prepared in the manner described in Example 6. The material was dried and twenty grams of particles of a size passing through a 4 mesh and remaining on a 20 mesh sieve were selected. These particles contained 40% of the nickel oxide-on-carbon powder and 60% by weight of zirconia gel. The particles were placed in a rocking bomb and were treated with hydrogen at 218° C. in the manner described in Example 6. After reduction of the bomb temperature to 120° C., 100 ml. of xylene were added and ethylene was pumped into the reactor until a pressure of 1,050 pounds per square inch gauge was reached. As the pressure within the bomb lowered with consumption of ethylene, fresh quantities of ethylene were introduced to maintain substantially the 1,050 pounds per square inch gauge pressure. The temperature of 120° C. was maintained for a period of about two hours. A yield of 8.5 grams of solid polyethylene was obtained. The polyethylene was tough and flexible and exhibited a specific viscosity of $15,000 \times 10^{-5}$.

At the termination of the reaction period, the total contents of the bomb were removed and were diluted with several volumes of boiling xylene. The hot xylene solution was filtered to remove catalyst. The filtrate was then cooled to room temperature and the polyethylene was precipitated. Thereafter, the xylene was distilled and a residue of 3.5 grams of waxy polyethylene of lower molecular weight was obtained.

The simple and rapid separation exhibited in Examples 5, 6, and 7, the whole procedure of polymer separation from catalyst requiring only a few minutes, was in sharp contrast to the efforts made in the attempted separation of polyethylene from nickel carbon catalyst powder. In such cases of powdered catalyst, the polyethylene clung so tenaciously to the catalyst powder, and the finely divided catalyst powder in turn passed so readily through filtering devices, that even after several hours' operation, the separation of catalyst and polyethylene was not complete, and, in fact, a light gray polymer product was the clearest product obtainable.

In certain of the foregoing examples, it will be observed that powdered alumina was employed as an inert support. Alumina can also be employed as a gel, and dried granules of the gel containing the distributed powdered catalyst can be employed as the catalyst, much as the zirconia gel described in Example 6. Other inert supports can be used, such as titanium hydroxide and certain clays; alumina may be found useful in less purified form, for example as bauxite. The criteria are simply that the support and its adventitious constituents should be inert with respect to the ethylene and the polymerization reaction, should be sufficiently porous to give adequate exposure at spaced points of the metal-on-carbon catalyst powder, and should provide rugged, physically stable pellets.

Having described our invention, we claim:

1. A catalyst composition for effecting conversion of ethylene to polymers having a molecular weight higher than 12,000 and from which said polymers can readily be removed by solvent washing, which catalyst composition consists essentially of powdered catalyst particles distributed throughout a porous inert support, said particles being smaller than 200 mesh screen size in average particle size and consisting of a reduced oxide of a metal of the class consisting of cobalt and nickel deposited on an activated carbon in amounts in the range of .5 to 25 per cent by weight based on said powdered catalyst particles, said support constituting about 50 per cent to 98 per cent by weight of the total composition and being in the form of rugged masses resistant to disintegration, which masses are larger than 20 mesh screen size.

2. The composition of claim 1 wherein the activated carbon is an acid-leached activated coconut charcoal.

3. The method of polymerizing ethylene to form high polymers which method comprises contacting ethylene with a supported catalyst consisting essentially of particles having an average screen size smaller than 200 mesh and consisting of activated carbon containing about .5 to 25 per cent of a reduced oxide of a metal of the class consisting of cobalt and nickel which particles are distributed throughout an inert support in the form of rugged masses constituting 50 per cent to 98 per cent of the total catalyst composition and having a screen size greater than 20 mesh, effecting said contacting at a temperature in the range of 10° to 300° C. under a pressure of at least 50 p. s. i. g. and for a time sufficient to effect substantial conversion of ethylene into polymers having molecular weights higher than 12,000, and subsequently separating said polymers from surfaces of the catalyst composition by washing said masses with a solvent.

4. The method of claim 3 wherein the activated carbon is an acid-leached coconut charcoal.

References Cited in the file of this patent

UNITED STATES PATENTS

| | | |
|---|---|---|
| 1,680,807 | Schultze | Apr. 14, 1928 |
| 1,868,565 | Connolly | July 26, 1932 |
| 2,244,612 | Crowley | June 3, 1941 |
| 2,392,107 | Teter | Jan. 1, 1946 |
| 2,407,814 | Cheney | Sept. 17, 1946 |
| 2,475,648 | Stoner | July 12, 1949 |
| 2,600,379 | Doumani | June 17, 1952 |
| 2,692,261 | Peters et al. | Oct. 19, 1954 |